L. BRECH & E. TYBOROWSKI.
MANUFACTURE OF CELLULOSE FROM RAW VEGETABLE MATERIALS CONTAINING CELLULOSE FIBERS.
APPLICATION FILED APR. 17, 1911.
1,100,519.
Patented June 16, 1914.
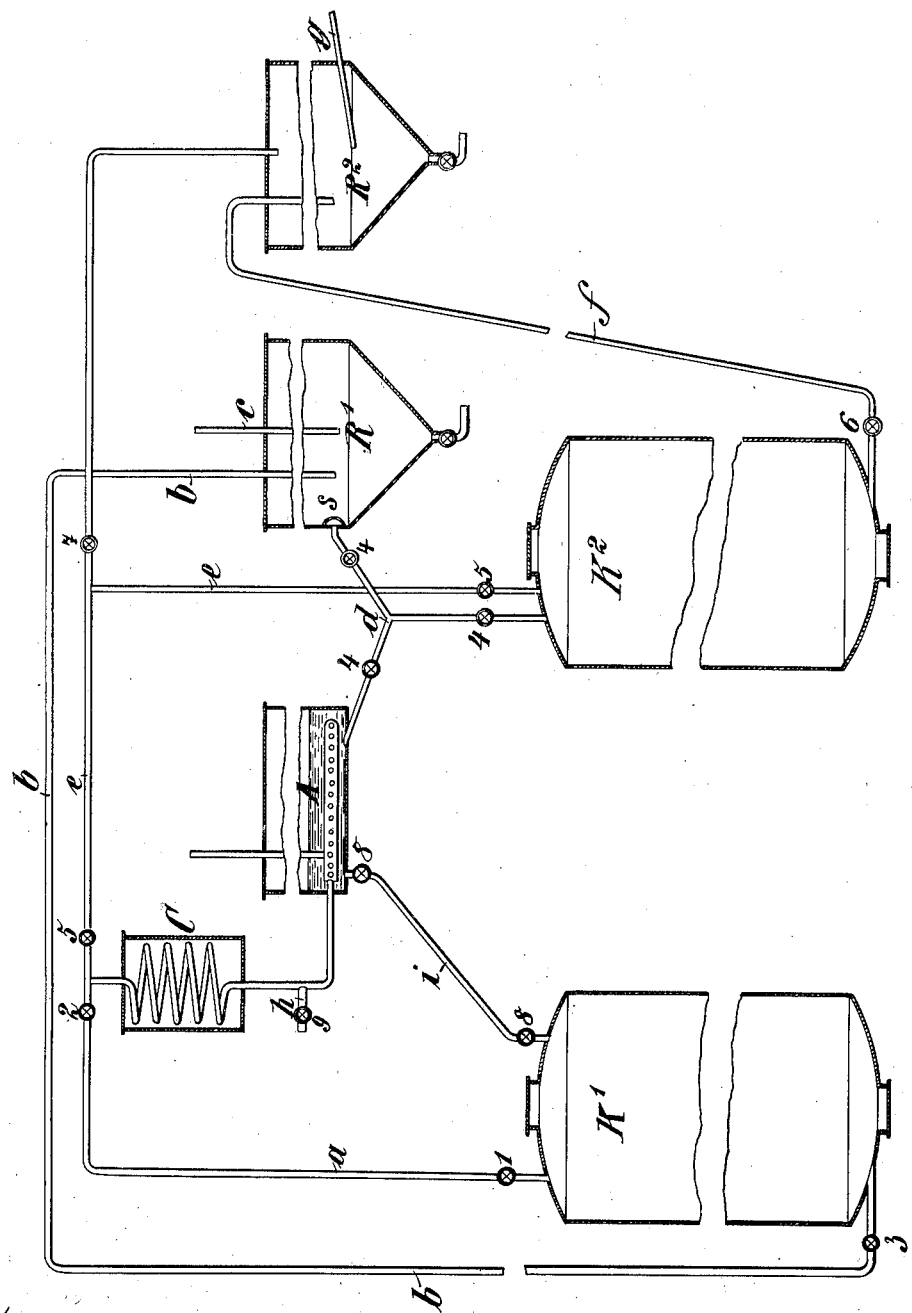

UNITED STATES PATENT OFFICE.

LEON BRECH AND EDMUND TYBOROWSKI, OF WARSAW, RUSSIA.

MANUFACTURE OF CELLULOSE FROM RAW VEGETABLE MATERIALS CONTAINING CELLULOSE FIBERS.

1,100,519. Specification of Letters Patent. Patented June 16, 1914.

Application filed April 17, 1911. Serial No. 621,692.

*To all whom it may concern:*

Be it known that we, LEON BRECH, a subject of the King of Prussia, and residing at Marschallstrasse 149, Warsaw, Russia, and EDMUND TYBOROWSKI, a subject of the Emperor of Russia, and residing at 149 Marschallstrasse, Warsaw, Russia, have invented certain new and useful Improvements in and Relating to the Manufacture of Cellulose from Raw Vegetable Materials Containing Cellulose Fibers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the manufacture of cellulose or wood pulp.

The particular solution that we use is ammonium sulfite maintained basic or alkaline by ammonia, obtained by conducting ammonia gas into an aqueous solution of sulfurous acid gas $SO_2$, and maintaining the ammonia in excess in the resulting solution.

By reason of the excess of ammonia, the pressure in the digesters is increased by the increase of volume of the ammonia gas due to the digesting temperature, and by reason of this increased pressure, the temperature at which the digestion is carried out need not be as high as that customarily used.

Microscopic examinations of the fibers obtained by our process show that they are much improved over those obtained without the use of an excess of ammonia and the yield is considerably greater.

The fibers are light in color, strong, readily bleached and practically unattacked or uninjured by the digesting solution.

During digestion with a neutral ammonium sulfite solution, a portion of the sulfurous acid ($SO_2$) is set free by the organic acids in the substances treated. This liberated acid causes the digesting solution to become more and more acid as the digestion proceeds. At the high temperature used, 160°–170° C., this free acid attacks the fibers and causes them to become acid-charred, i. e. colors them from brown to black, greatly impairing the appearance of the fiber. If, however, there is free ammonia, $NH_3$, in sufficient excess, this liberated acid combines with the base, the digesting solution remains basic and the disadvantageous action of the sulfurous acid at the high drying temperature is entirely avoided.

We proceed preferably as follows: Calcium bisulfite solution is caused to be acted upon with ammonia and the calcium is precipitated as mono-sulfite which is preferably removed before cooking. The resulting solution contains ammonium sulfite with an excess of free ammonia. With the use of such solutions a good yield of cellulose, having good properties can be obtained from freshly cut wood containing large quantities of resin. The use of the excess of ammonia by reason of its ready expansibility increases the pressure, so that at a low temperature the necessary high pressure is attained. The ammonia in the lye after cooking is recovered and utilized for the treatment of new and larger quantities of raw material. The ammonia can be recovered from the solution whether said solution contains ammonia alone, or a mixture containing ammonia, either free, or wholly or in part combined, by driving it from the spent liquor and collecting it, or by adding strong bases to decompose the ammonia combinations.

The humus substances and silica precipitate from the warm solutions in a readily filterable condition, and so can be readily removed. The filtrate is then used as it is, or an excess of ammonia may be added thereto. The ammonia alkaline solution so obtained is in general sufficiently concentrated that it may be diluted with two or three times its volume of water for treating new quantities of raw material.

The solution resulting from the treatment of wood may be used for the treatment of straw before recovering the ammonia therefrom and throwing away the spent solution.

If salts have been added to the above-described solution, they are recovered in any well known manner.

The apparatus for carrying out our invention is shown in the accompanying drawing, and in connection therewith it will be assumed that, as an example, the solution used therein is ammonium sulfite solution containing ammonia.

The material, wood chips, is placed in the hermetically sealed digester K' with the ammonium sulfite solution containing ammonia and cooked as usual, valves 1, 3 and 8 being closed. The cooking takes place under a pressure of from 10 to 12 atmospheres, mostly produced by the expansion of the ammonia gas due to the heat, the temperature, however, being considerably below the boiling point of the digesting liquid at this pressure. When the cooking or digesting has finished, valves 1 and 2 are opened and the ammonia gas and water vapor pass through pipe $a$ to cooler or worm C and thence to the perforated pipe 10 in the bottom of the absorption vessel A filled with cold water. As soon as the ammonia has passed over, valve 1 is closed and valve 3 opened. The pressure in K' forces the liquid through pipe $b$ to the regenerator R'. A pump or other transferring device may be placed in pipe $b$ if found necessary or desirable. Sulfurous acid, either in aqueous solution or gaseous form is admitted to R' through pipe $c$. Humus acid, silica, &c. are thus precipitated on the conical bottom. The supernatant liquid in R' is drawn off through valve 14, pipe $d$ and valve 24 into a second digester $K^2$ previously filled with wood chips, any solids being retained by sieve S. Valve 4 is then opened to admit the ammonia solution from absorption vessel A. Valves 4, 14 and 24 are then closed and digestion proceeds in $K^2$, care being taken that an excess of ammonia is present. Upon completion of the treatment of the wood in $K^2$ valve 2 is closed and valves 5 and 15 opened to conduct the ammonia and vapor through pipe $e$ to the cooler C and absorption tank A. Valve 5 is then closed and valve 6 is opened to permit the pressure in $K^2$ to force the liquid contents through pipe $f$, which may or may not be provided with a pump or other liquid transferring device, as may be deemed most expedient, to the second regenerator $R^2$. Lime is added to the solution in $R^2$ to liberate the combined ammonia, which, preferably but not necessarily, is driven by means of steam admitted by pipe $g$ through pipe $e$ and valve 7 to the cooler C and absorption vessel A. The absorbed ammonia is conducted through valves 18 and 8 and pipe $i$ into the digester K' for the treatment of a new quantity of wood.

The liquid from digester $K^2$ can be directly used for digesting straw before being passed to the regenerator $R^2$.

The liquid in regenerator $R^2$ freed from ammonia, contains a large quantity of ammonium salts which are recovered in any well known manner.

In the above example we have illustrated our process as being carried out as an ammonium sulfite process.

It is advantageous that the first wash water for washing the digested cellulose in the digesters also be regenerated by the addition of sulfurous acid.

The yield of fiber in our process is considerably greater than in other processes, and the fiber is strong and of good appearance.

Example: The digestion of freshly cut pine is carried out as follows:—The solution or lye used contains from 3% to 3.50% of $SO_2$ and from 1.75% to 2% of $NH_3$ which is equivalent to 3.50% to 4% $SO_2$ and 2% to 2.25% $NH_3$ by weight of the dried wood. When thus made the solution is strongly alkaline and contains about 1% free ammonia.

The digestion takes place in about 10 hours at a temperature of 165° C. and pressure 10-12 atmospheres yielding about 65% readily bleached cellulose.

With raw material containing but little resin or free from resin, as fir, poplar, aspen, grasses and straw, the solution may be made weaker.

We claim—

1. Process for producing fiber from raw vegetable material, which comprises digesting said material under pressure with an ammonium sulfite solution in the presence of free ammonia, thereby reducing the temperature at which the digestion takes place and increasing the pressure above that customarily used.

2. Process for producing fiber from vegetable material, which comprises digesting said material under pressure with a digesting solution containing ammonia, in excess of that capable of combining with other substances in the solution.

3. Process of producing fiber from raw vegetable material which comprises digesting the material under pressure with an ammonium sulfite solution, containing uncombined ammonia, driving off the ammonia from the used liquor, and regenerating the solution with sulfurous acid, separating the liquid and precipitate and then regenerating the liquid with ammonia.

4. Apparatus for digesting cellulose, comprising a closed digester, a regenerator connected thereto, means for cooling the ammonia gas liberated from the digester, an absorbing vessel, and means for conducting the ammonia thereto from the cooling means, means to supply to the solution transferred from the digester to the regenerator a reagent capable of liberating ammonia gas, means to conduct said ammonia gas to the cooler, means to conduct the solution from the regenerator to a second digester and means to conduct the absorbed ammonia from said vessel to said second digester.

5. Process for producing fiber from vegetable material, which comprises digesting the raw material in a sulfite solution in the presence of ammonia gas in excess under pressure and at a temperature about 165° C.

In testimony that we claim the foregoing as our invention, we have signed our names in presence of two subscribing witnesses.

LEON BRECH.
EDMUND TYBOROWSKI.

Witnesses:
  FRANCIS TREMTICKI,
  AUDREY KUSWAJ.